United States Patent [19]

Matczak et al.

[11] Patent Number: 5,209,596
[45] Date of Patent: May 11, 1993

[54] SEAL COMPONENT AND ROD END ASSEMBLY UTILIZING SAME

[76] Inventors: Stanley E. Matczak, 16 Kibbe Rd., Ellington, Conn. 06029; Joseph A. Matczak, Taylor St., Talcottville, Conn. 06066

[21] Appl. No.: 620,573

[22] Filed: Dec. 3, 1990

Related U.S. Application Data

[63] Continuation-in-part of Ser. No. 476,154, Feb. 7, 1990, Pat. No. 5,069,571.

[51] Int. Cl.$^5$ .................................. F16C 11/00
[52] U.S. Cl. .................................. 403/134; 403/76; 411/542
[58] Field of Search .................... 403/131, 134, 76; 411/542, 369, 432, 533

[56] References Cited

U.S. PATENT DOCUMENTS

| | | | |
|---|---|---|---|
| 1,020,738 | 3/1912 | Bayer. | |
| 1,567,649 | 12/1925 | Hultgren et al. | |
| 2,053,583 | 9/1936 | Summers | 287/90 |
| 2,761,349 | 9/1956 | Heller | 411/432 |
| 2,828,984 | 4/1958 | Ho chow | 287/90 |
| 2,908,507 | 10/1959 | Blanks, Sr. et al. | 280/95 |
| 2,974,986 | 3/1961 | Hazard | 403/76 |
| 2,981,651 | 4/1961 | Arnold | 411/542 X |
| 2,983,534 | 5/1961 | Heller et al. | 411/542 |
| 3,030,134 | 4/1962 | Gair | 287/88 |
| 3,292,957 | 12/1966 | Ulderup | 403/134 |
| 3,441,299 | 4/1969 | Pfaar | 287/88 |
| 3,519,279 | 7/1970 | Wagner | 277/166 |
| 3,572,414 | 3/1971 | Onufer | 151/19 |
| 3,585,894 | 6/1971 | Brown | 85/41 |
| 3,803,793 | 4/1974 | Dahl | 52/758 F |
| 4,019,550 | 4/1977 | DeHaitre | 151/7 |
| 4,934,856 | 6/1990 | Pauc | 411/542 |

FOREIGN PATENT DOCUMENTS

| | | | |
|---|---|---|---|
| 1400898 | 5/1969 | Fed. Rep. of Germany | 411/542 |
| 2227468 | 11/1974 | France | 411/369 |
| 866922 | 5/1961 | United Kingdom | 411/542 |

Primary Examiner—Andrew V. Kundrat
Attorney, Agent, or Firm—Fishman, Dionne & Cantor

[57] ABSTRACT

A spherical rod end assembly includes a seal component in the form of a fastener or a washer, or a combination thereof. The seal component has a flexible, resilient skirt, affixed to a metal body, which skirt overlies and seals the cavity within which the ball of the assembly is seated, to exclude dirt and other foreign matter, and to enhance lubrication.

21 Claims, 3 Drawing Sheets

SEAL COMPONENT AND ROD END ASSEMBLY UTILIZING SAME

CROSS REFERENCE TO RELATED APPLICATION

This application is a continuation-in-part of copending application for Letters Patent Ser. No. 07/476,154, filed on Feb. 7, 1990 and now issued as U.S. Pat. No. 5,069,571.

BACKGROUND OF THE INVENTION

Spherical rod end assemblies are extensively used for a wide variety of applications, such as in steering linkages for land vehicles, in aircraft surface controls, in automatic door control mechanisms, and in numerous other mechanical, hydraulic and pneumatic systems. Unless effectively sealed, dirt and other foreign matter invariably collects within the ball-seating cavities of such assemblies, causing excessive wear of components and poor performance; ineffective lubrication will of course exacerbate such problems.

Elements made of rubbery materials have in the past been used in assembly with nuts, bolts and washers, to seal thread joints and to prevent loosening of engaged components. Disclosures of that kind are found in the following U.S. Pat. Nos. Hultgren et al No. 1,567,649, Wagner No. 3,519,279, Onufer No. 3,572,414, Brown No. 3,585,894, Dahl No. 3,803,793, and DeHaitre No. 4,019,550. In addition, Blanks, Sr., et al U.S. Pat. No. 2,908,507 appears to show an element overlying the socket of a tie rod body portion and extending about the steering arm pin seated therein (see FIGS. 2 and 3). U.S. Pat. No. 2,828,984, to Ho Chow, employs protective elastic sleeves to seal linkage joints against dust and lubricant loss.

Despite the activity in the art indicated by the foregoing, a need remains for simple and inexpensive means by which the ball-seating socket of a spherical rod end assembly can be effectively sealed against the entry of foreign matter, and by which the effectiveness of lubrication of the parts thereof can readily be improved. Accordingly, it is an object of the present invention to provide a spherical rod end assembly in which those needs are satisfied.

A related object of the invention to provide simple and inexpensive seal components which may readily be employed in a spherical rod end assembly, and for diverse other applications, to afford such protection in a highly convenient and effective manner, which components may in addition afford greatly improved lubrication for associated parts.

SUMMARY OF THE INVENTION

It has now been found that certain of the foregoing and related objects of the invention are attained by the provision of an assembly comprised of a spherical rod end having a head portion with an opening of spheric cross section therewithin, a ball pivotably seated within the opening of the head portion, and fastener means. A first component of the fastener means has a shank portion extending through a bore in the ball, and a second component thereof is engaged on the shank portion of the first. One component (be it the "first" or "second," or a third component) of the fastener means, disposed on each side of the rod end portion, constitutes a seal component and is comprised of a rigid body element and a sealing element, the latter having an inner portion continuously surrounding the peripheral marginal portion of the body element and sealingly affixed to it. A flexible, resilient, composite wall portion extends from about the inner portion of the seal element and is outwardly flared to terminate at a flexible peripheral lip, the lip being in movable sealing engagement with the exterior surface of the head portion to which it is adjacent, surrounding the opening therein. The wall portion of the sealing element is comprised of an outside shell made of a tough, dense, nonporous material, and an integral lining at least substantially covering the interior face of the wall portion and made of a foraminous material.

In preferred embodiments, the wall portion of the sealing element will be frustoconical, with a circumferential lip, and it will most desirably form an angle of 15° to 30° with the central axis through the body of the component. The foraminous material of which the lining is fabricated will advantageously have an open cellular, and most desirably foamed rubber, structure. When the seal component comprises a bolt, its threaded shaft provides the shank portion of the "first" component of the fastener means, and its head provides the rigid body element thereof. When it comprises a nut, the seal component provides the "second" component of the fastener means and the nut constitutes the requisite body element.

The fastener means may additionally include one or two washers or bushings (both types of components sometimes being referred to herein as "washer members") disposed on the shank of the "first" component, directly adjacent either or both of the exterior surfaces of the rod end head portion; the washer member(s) will thus provide the seal component(s) of the fastener means, and will constitute the rigid body element thereof. Regardless of the form of the seal component, the body element will normally be fabricated from metal. The sealing element may be molded upon the body, and an adhesion-promoting substance may advantageously be applied to the marginal portion of the metal body to enhance the strength of the bond; alternatively, tight frictional interengagement may be relied upon to affix the sealing element to the body element.

Other objects of the invention are attained by the provision of a seal component, as herein described.

DETAILED DESCRIPTION OF THE ILLUSTRATED EMBODIMENTS

Figure 1:
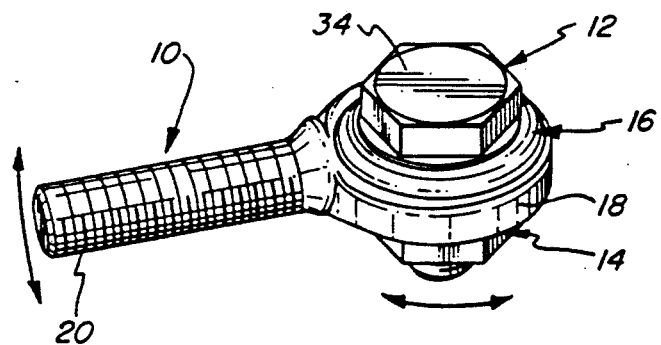
FIG. 1 is a perspective view showing a spherical rod end assembly embodying the present invention.
Figure 2:
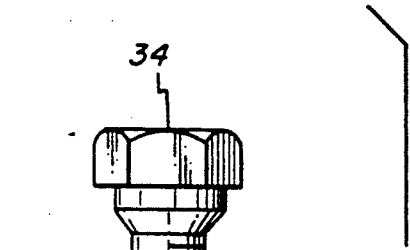
FIG. 2 is an exploded elevational view of the assembly of FIG. 1.

Turning first in detail to FIGS. 1-5 of the appended drawings, therein illustrated is a spherical rod end assembly embodying the present invention, including a spherical rod end, a bolt, a nut and a pair of sealing washers, generally designated respectively by the numerals 10, 12, 14 and 16. The rod end 10 consists of a head portion 18 and a threaded shank portion 20, the head portion 18 having an integral insert 24 (FIG. 5) affixed thereon, providing an opening 26 defined by a spheric wall surface. A truncated ball, generally designated by the numeral 28, is rotatably and pivotably seated within the opening 26, and has a diametric bore 30 through which extends the threaded shaft 32 of the bolt 12.

Each of the sealing washer components 16 consists of a metal washer 36 and a flared, frustoconical composite skirt element, generally designated by the numeral 40. One washer component 16 is disposed at each end of the ball 28, under the nut 14 and the head 34 of the bolt 12, respectively, lying directly upon the flat truncating surface 29 with its hole 38 aligned with the bore 30 thereof.

Figure 5:
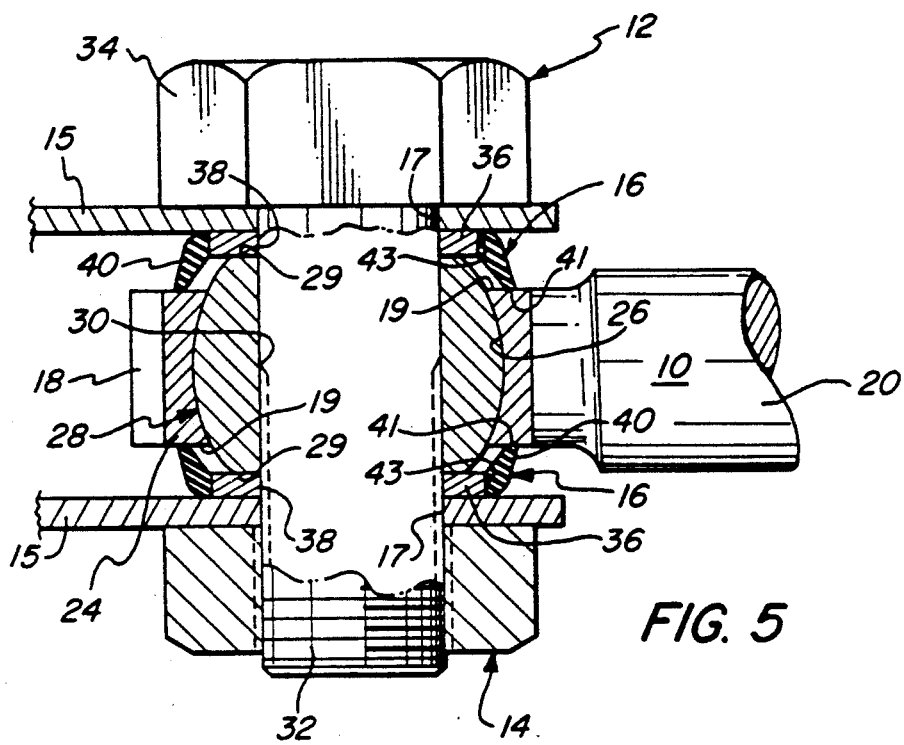
FIG. 5 is a fragmentary sectional view showing the assembly of the invention mounted on a supporting part.
Figure 3:
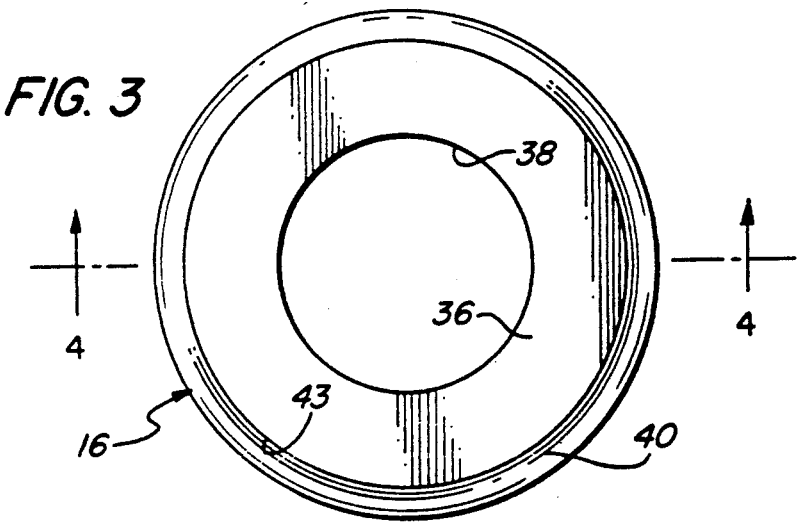
FIG. 3 is a plan view of a sealing washer embodying the invention and utilized as a seal component in the assembly of the foregoing Figures, drawn to an enlarged scale.

As shown in FIG. 5, the assembly is mounted between spaced flanges 15 of a fragmentarily illustrated supporting part (e.g., a clevis), the flanges 15 having apertures 17 through which pass the shaft 32 of the bolt 12. The washer components 16 are oriented with their sealing skirts 40 directed inwardly, causing the terminal edge 41 of the circumferential lip portions thereof to bear upon the surfaces 19 of the head portion 18 adjacent thereto, surrounding the opening 26. With the nut 14 tightened upon the bolt 12, the washer components 16 are urged inwardly, thus bringing the lip portions thereof into intimate sealing engagement with the surfaces 19.

Figure 4:
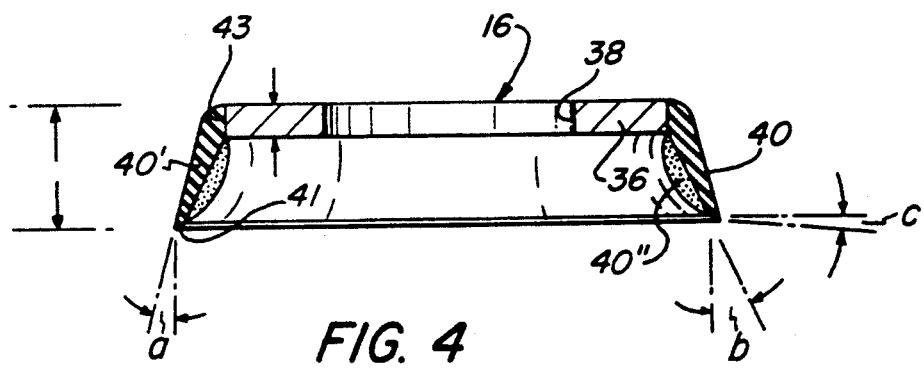
FIG. 4 is a sectional view of the sealing washer of FIG. 3, taken along line 4—4 thereof.

As best seen in FIG. 4, the composite skirt element 40 consists of an outer lamina or shell 40', and an inner lamina or lining 40" covering the inside face of the element 40. The shell 40' is made of a dense, nonporous material, and the lining 40' is foraminous; normally, both laminae will be fabricated from a rubbery or elastomeric material, with the lining preferably being provided by an open-cell, foamed rubber.

In the illustrated embodiment, the shell 40' is of outwardly tapered cross section, typically with an angle of taper of approximately 15°. Taken with reference to a vertical axis (i.e., the central axis) through the hole 38 of the washer 36, the exterior surface of the shell 40' may therefore desirably be disposed at an angle "a" of 15°, with the interior surface thereof disposed at an angle "b" of 30° to the axis. Such a construction will promote flexibility of the lip portion, while permitting the inner end portion, at which the skirt element joins the peripheral edge 43 of the washer 36, to be relatively heavy and inflexible; these features will afford durability, coupled with most effective performance in at least certain instances. Nevertheless, it should be appreciated that the shell 40' of the skirt element may be of uniform cross section throughout, as may be optimal in same cases.

Regardless of whether the shell wall is tapered or of uniform thickness, and indeed regardless of whether or not a foraminous lining is present thereon, it will be advantageous to so form the skirt element that the angle "b" will have a value of 15° to 30°, and preferably of at least 20°. This will promote a highly effective dynamic sealing action, while ensuring against inversion of the flexible skirt element.

As can also be seen, the edge surface 41 on the lip portion will advantageously be inwardly bevelled, typically at an angle "c" of approximately 5° to a plane parallel to that of the washer 36. This will help to ensure effective sealing upon the adjacent surface of the rod end, despite the distortion and movement that occurs when the ball 28 swivels within the head portion, as is of course its essential function. The edge bevel also helps to ensure that a close fit is maintained with contoured surfaces, which frequently surround such socket openings.

The sealing component will desirably be fabricated by molding the shell lamina 40' of the skirt element directly upon an edge of the metal body, which will advantageously constitute (as does the washer 36), or provide, a circumferential flange portion. To ensure a tight and strong bond with the elastomeric material, the edge 43 of the washer will desirably be roughened, and it may carry an agent to increase adhesion, the choice of which will depend upon the composition of the material used to produce the skirt element itself.

The foraminous liner 40" may be a foamed-in-place layer produced directly upon the lamina 40', or it may be an added layer of foam rubber, a fibrous material, or the like, bonded to the shell. It should be appreciated that the function of the liner is to hold and distribute lubricant (as by partial encapsulation or by capillary action), and to wipe the surfaces contacted thereby; any material capable of doing so, while affording the dynamic action, durability, and other properties required in the skirt element, may therefore constitute the foraminous liner.

Figure 7:
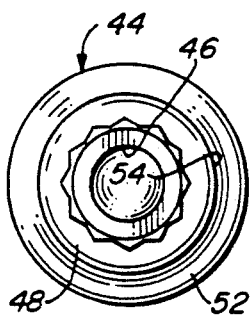
FIG. 7 is a left-end elevational view of the bolt of FIG. 6.
Figure 6:
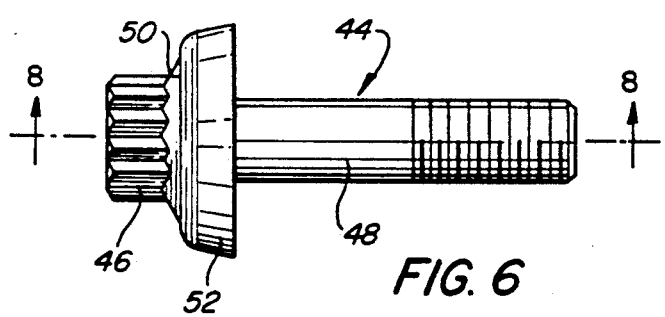
FIG. 6 is an elevational view of a bolt constituting a seal component embodying the invention; seal component embodying the invention.
Figure 8:
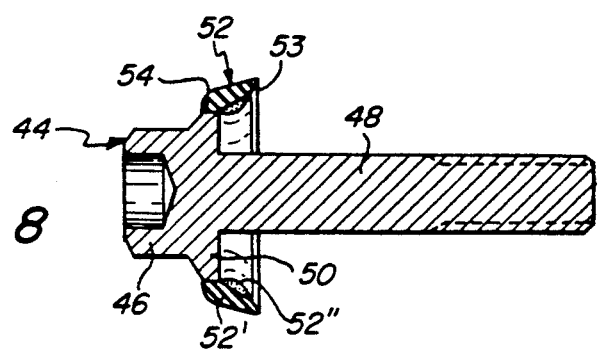
FIG. 8 is a sectional view of the bolt, taken along line 8—8 of FIG. 6.

The rod end assembly of the invention may be employed in either a double shear (as illustrated) or a single shear installation; thus, a nut or a bolt, having an integral sealing element, may be suitable for use therein. FIGS. 6–8 illustrate such a bolt component, generally designated by the numeral 44. It has a 12-point head 46 at one end, a threaded shaft 48 at the other, and a composite skirt element, generally designated by the numeral 52, bonded to the rim of the flange 50 extending about its head 46. The element 52 is comprised of a dense, nonporous shell 52', and a foraminous liner 52". In a manner similar to that described with respect to the embodiment of FIGS. 1-5, the edge surface 54 of the flange 50 on the bolt head may be prepared to promote maximum bond strength; also, the lip portion of the skirt 52 is formed with a bevel 53, to best accommodate movement and non-planar contact surfaces.

Figure 10:
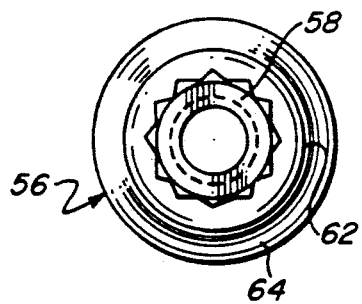
FIG. 10 is a left-end elevational view of the nut of FIG. 9.
Figure 9:
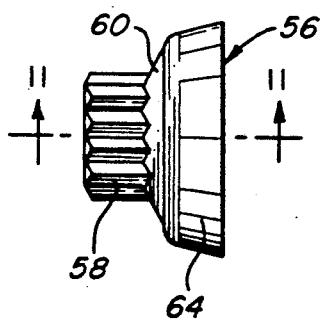
FIG. 9 is an elevational view of a nut constituting a seal component embodying the invention.
Figure 11:
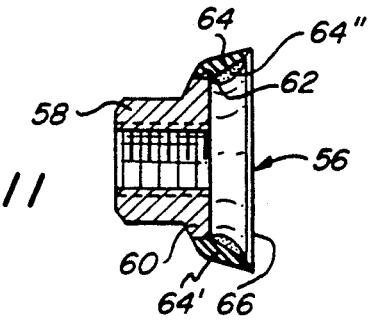
FIG. 11 is a sectional view of the nut taken along line 11—11 of FIG. 9.

Turning now to FIGS. 9-11 of the drawings, the illustrated sealing nut component, generally designated by the numeral 56, consists of a 12-point nut 58 having a circumferential flange 60, to the edge 62 of which is bonded a composite sealing skirt 64. Here again, the element 64 consists of a nonporous shell 64' and a foraminous liner 64", and it has an outer beveled edge surface 66, for the purposes mentioned.

Figure 12:
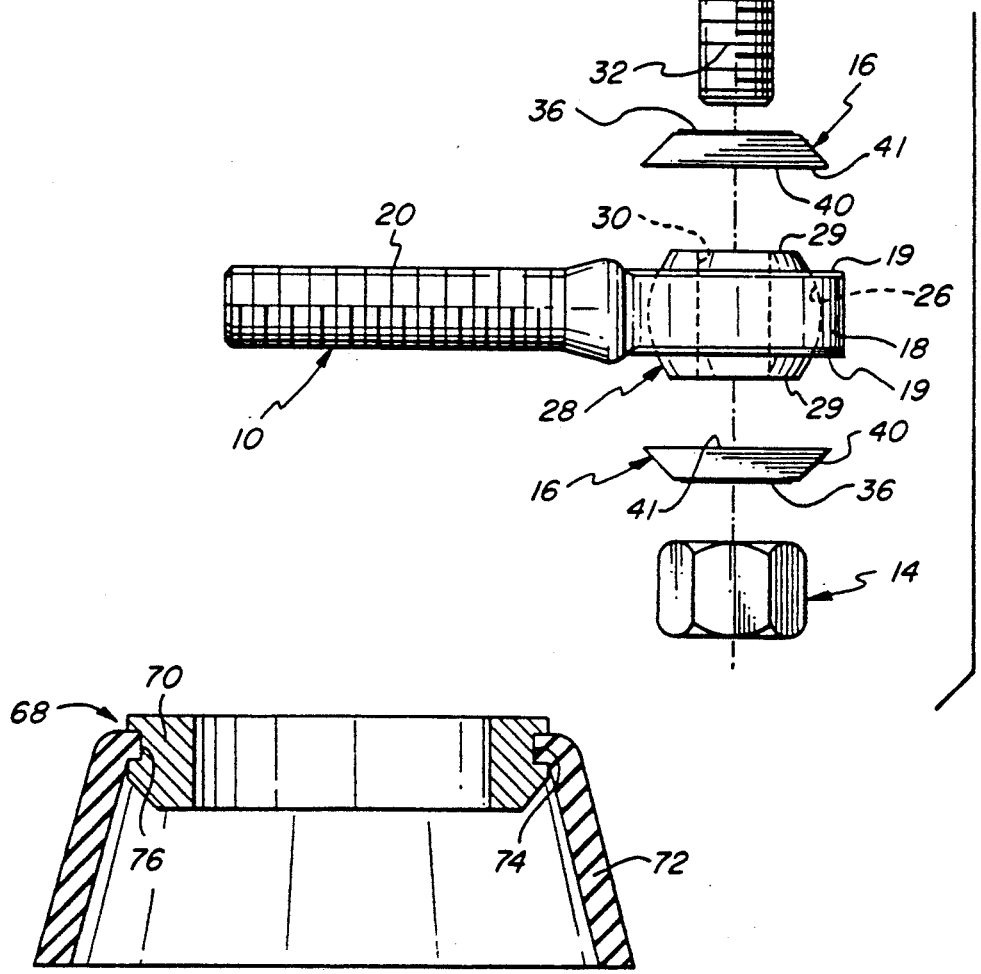
FIG. 12 is a sectional view of a bushing constituting a seal component embodying the invention.

Finally, FIG. 12 illustrates a sealing bushing component, generally designated by the numeral 68, consisting of a circular metal bushing 70 and an elastomeric sealing skirt 72. The outer surface of the bushing 70 has a circumferential groove 74 formed into it, and the skirt 72 has an internal bead element 76 surrounding its smaller diameter end. Needless to say, the skirt 72 is dimensioned to tightly embrace the bushing 70, with the bead element 76 sealingly engaged in the groove 74 and cooperating to affix the components in assembly with one another, and thereby obviating the need for any adhesive or other supplementary fastening means.

It will be appreciated that the components of which the assembly of the invention is comprised will normally be made of metal (e.g., steel, aluminum, brass, etc.), except of course for the sealing skirt element. As to the latter, any suitable natural rubber or synthetic polymer may be employed; neoprene rubber, polyurethanes, styrene/butadiene rubbers, nitrile elastomers, and silicone resins might be mentioned as typical, but the selection of a suitable material for any given application will be evident to those skilled in the art.

The liner and the shell of the skirt element may either be made of the same, or of different, materials, depending of course upon the properties that each is to exhibit, and the manner by which it is to be fabricated and assembled. The liner may constitute only a relatively thin layer upon the surface of the shell, as illustrated, or it may substantially fill the volume therewithin. It will generally be important however that the liner material not cover the contact face of the associated metal body, since that would compromise the level of torque and fastening security that can be obtained by use thereof.

In addition to providing the requisite flexibility, resiliency and durability under the variety of conditions to which the rod end assembly might be exposed, the material from which the shell of the skirt element is formed will, in certain embodiments, be capable of producing a rubber-tearing bond with the metal element. As indicated above, that may be promoted by the use of an adhesive, a bonding agent, a chemical surface activator, or the like (the choice of which will also be evident to those skilled in the art), as well as by roughening of the surface of the component to which the rubber is to be bonded (e.g., by sand-blasting or the equivalent), or by other means. In such instances, the shell of the sealing component will normally be integrally formed by molding of the elastomeric material directly to the metal piece, as by a compression, injection or transfer molding technique; bonding of preformed, separate skirt elements may however also be feasible.

Thus, it can be seen that the present invention provides simple and inexpensive means by which the ball-seating socket of a spherical rod end assembly can be effectively sealed against the entry of foreign matter, and by which the effectiveness of lubrication of the parts thereof can readily be improved. The invention also provides simple and inexpensive sealing components that are suitable for use in a spherical rod end assembly, as well as for a wide diversity of other applications, to afford such protection and enhancement in a convenient and highly effective manner.

Having thus described the invention, what is claimed is:

1. A spherical rod end assembly comprising: a spherical rod end having a head portion with an opening of spheric cross section therewithin, and with exterior surfaces on opposite sides of said head portion surrounding said opening; a ball pivotably seated within said opening of said rod end head portion, said ball having a bore therethrough; and fastener means comprised of a plurality of components, a first of said components of said fastener means having a shank portion extending through said bore of said ball, and a second of said components being engaged on said shank portion of said first component, at least one component of said fastener means being a seal component comprised of a rigid body element with a peripheral marginal portion, and a sealing element having an inner portion continuously surrounding said marginal portion of said body element and sealingly affixed thereto, and having a flexible, resilient composite wall portion extending from about said inner portion, said wall portion being outwardly flared and terminating at a flexible peripheral lip in movable sealing engagement with said exterior surface of said head portion adjacent thereto, and being comprised of an outside shell made of a tough, dense, nonporous material, and a lining made of a foraminous material integral with said shell and at least substantially covering the interior face of said wall portion.

2. The assembly of claim 1 wherein said wall portion of said sealing element is frustoconical and terminates in a circumferential lip.

3. The assembly of claim 1 wherein said foraminous material of said lining is of open cellular structure.

4. The assembly of claim 1 wherein said foraminous material is a foamed rubber.

5. The assembly of claim 1 wherein said seal component comprises a bolt having a head and a threaded shaft, said bolt providing said first component of said fastener means, with said head providing said rigid body element of said seal component.

6. The assembly of claim 1 wherein said seal component comprises a nut, said nut providing said second component of said fastener means and constituting said rigid body element of said seal component.

7. The assembly of claim 1 wherein said fastener means additionally includes at least one washer member disposed on said shank of said first component directly adjacent said adjacent exterior surface of said rod end head portion, said washer member providing said seal component of said fastener means on at least one of said sides of said rod end portion and constituting said rigid body element thereof.

8. The assembly of claim 7 wherein said fastener means includes two of said washer members, one of said washer members providing said seal component on both of said sides of said head portion.

9. The assembly of claim 1 wherein said body element of said seal component is fabricated from metal.

10. A seal component adapted for use in a spherical rod end assembly, or the like, comprising a rigid body element with a peripheral marginal portion, and a sealing element having an inner portion continuously surrounding said marginal portion of said body element and sealingly affixed thereto, and having a flexible, resilient, composite wall portion extending from about said inner portion, said wall portion being outwardly flared and terminating at a flexible outer peripheral lip, and being comprised of an outside shell made of a tough, dense, nonporous material, and a lining made of a foraminous material integral with said shell and at least substantially covering the inner face of said wall portion.

11. The seal component of claim 10 wherein said wall portion of said sealing element is frustoconical and terminates in a circumferential lip.

12. The seal component of claim 10 wherein said foraminous material of said lining is of open cellular structure.

13. The seal component of claim 12 wherein said foraminous material is a foamed rubber.

14. The seal component of claim 10 wherein said seal component is a bolt having a head and a threaded shaft, said head providing said rigid body element thereof.

15. The seal component of claim 10 wherein said seal component is a nut, said nut constituting said rigid body element thereof.

16. The seal component of claim 10 wherein said seal component is a washer member, said washer member constituting said rigid body element thereof.

17. The seal component of claim 10 wherein said body element is fabricated from metal.

18. The seal component of claim 17 wherein said body element includes a circumferential flange portion providing said marginal portion.

19. The seal component of claim 10 wherein said shell of said seal component sealing element wall portion is molded upon said body element.

20. The seal component of claim 19 wherein said body element of said seal component has an adhesion-promoting substance carried on said marginal portion thereof for enhancement of the level of bond strength of said shell thereto.

21. The assembly of claim 10 wherein said sealing element is frictionally interengaged with said body element, said seal component being devoid of adhesive or other supplementary fastening means for affixing together said sealing element and body element thereof.

* * * * *